United States Patent
Stober, Jr. et al.

[11] 3,791,036
[45] Feb. 12, 1974

[54] DRAFTING INSTRUMENT

[76] Inventors: Leslie V. Stober, Jr.; Victor C. Mathis, both of 13006 Raytown Rd., Kansas City, Mo. 64140

[22] Filed: July 3, 1972

[21] Appl. No.: 268,525

[52] U.S. Cl............................................. 33/27 C
[51] Int. Cl............................................. B43l 9/04
[58] Field of Search........... 33/27 R, 27 C, 158, 159

[56] References Cited
UNITED STATES PATENTS

| | | | |
|---|---|---|---|
| 3,263,334 | 8/1966 | Mutter | 33/27 C |
| 2,612,690 | 10/1952 | Cotton | 33/27 C |
| 3,292,262 | 12/1966 | Moll | 33/27 C |
| 2,983,048 | 5/1961 | Keller | 33/27 C |

*Primary Examiner*—Harry N. Haroian
*Attorney, Agent, or Firm*—Fishburn, Gold & Litman

[57] ABSTRACT

A drafting instrument for drawing circles and arcs, said instrument including an elongate arm adapted to overlie, in substantially parallel relation, a work surface on which a circle or arc is to be drawn, said arm having a plurality of marking device receiving apertures therethrough and having indicia to indicate the position of the apertures. The instrument or compass also includes eccentric adjusting means for fine adjustment of the desired radius with indicia to indicate the amount of fine adjustment and includes transparent sighting means with a center designation for visual positioning of the compass on the work surface.

8 Claims, 5 Drawing Figures

Patented Feb. 12, 1974

3,791,036

DRAFTING INSTRUMENT

The principal objects of the present invention are: to provide an improved instrument for drawing circles or arcs wherein the radius is infinitely and accurately variable over the range of the instrument; to provide such an instrument with eccentric adjusting means for quick, easy and accurate fine adjustment of the desired radius; to provide such an instrument or compass with spaced apart apertures through the radius blade or arm of the compass for selectively receiving a marking device, the spacing of the apertures to be substantially equal to the range of eccentric adjusting means and to provide for a quick, easy and accurate course adjustment of the compass; to provide such a compass with indicia to indicate the amount of fine adjustment and the position of the spaced apertures to eliminate the need for a separate scale to set a compass to the desired radius; to provide such a compass with an axle member having a transparent center locater that has a magnifier and a visible mark on the axis of rotation of the compass arm so that the center of the arc to be drawn can be visually located quickly and accurately and the axle member held stationary as the arm is rotated thereabout; to provide such a compass with a friction device to engage the work surface to help prevent slippage of the compass on the work surface during use so as to eliminate the need for pins or the like that would mar or perforate the work surface; to provide such a compass that is compact in structure with a minimum of parts and easy to handle; and to provide such a compass that is easy and inexpensive to manufacture.

Other objects and advantages of this invention will become apparent from the following description taken in connection with the accompanying drawings wherein are set forth by way of illustration and example certain embodiments of the present invention.

Figure 1:
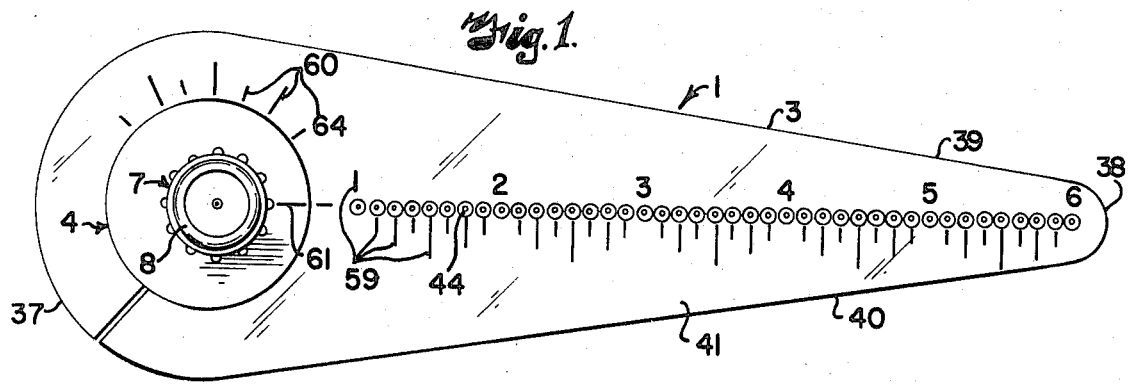
FIG. 1 is a top view of a drafting instrument with the eccentric adjustment means in the normal position.
Figure 3:
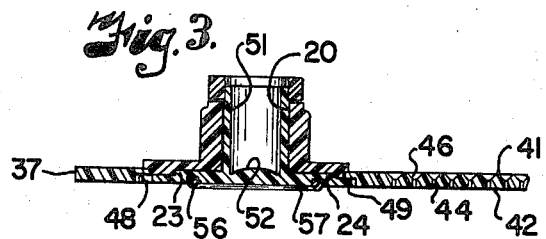
FIG. 3 is a sectioned fragmentary elevational view of the compass eccentric adjustment means.

Referring more in detail to the drawings:

As required, detailed embodiments of the invention are disclosed herein, however, it is to be understood that these embodiments are merely exemplary of the invention, which may be embodied in many forms that are different from the illustrative embodiments presented herewith. Therefore, specific structural and functional details disclosed herein are not to be interpreted as limiting, but merely as a basis for the claims actually defining the scope of this invention.

The reference numeral 1 designates generally a drafting instrument or compass for drawing arcs and circles. The compass 1 is provided with an elongate arm or radius blade 3 rotatable on a mounting structure designated generally by 4 and is adapted to overly, in substantially parallel relation, a work surface (not shown) on which an arc is to be drawn. The mounting structure includes a support member 7, an axle member 5 and a fastening member 8.

Figure 2:
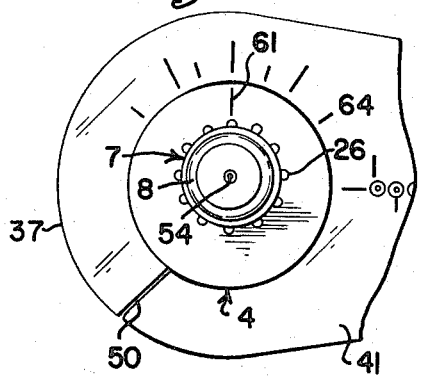
FIG. 2 is a fragmentary top view of the compass with the eccentric adjustment means in a fine adjustment position.
Figure 4:
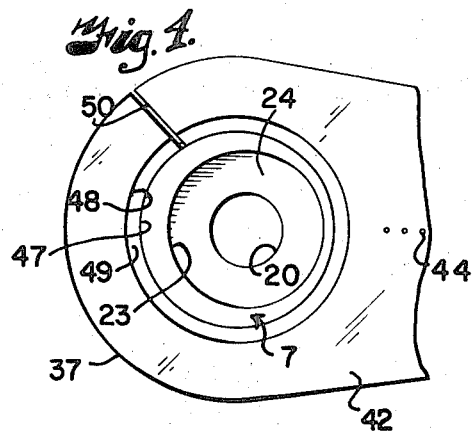
FIG. 4 is a fragmentary bottom view of a position of the compass eccentric adjustment means.
Figure 5:
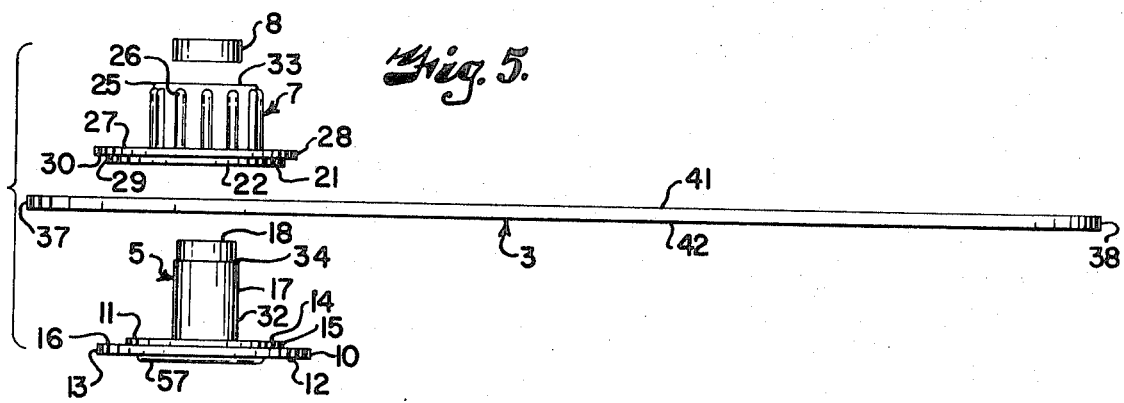
FIG. 5 is an exploded elevational view of the compass.

In the illustrated structure, the axle member 5 has and enlarged base portion 10 which is preferrably a disc like member and having an upper face 11, a lower face 12 and a peripheral edge 13. The base portion is of reduced thickness adjacent the edge 13 forming a cylindrical portion 14 with an outer periphery 15 spaced inwardly from the outer periphery 13 of the base portion 10 as illustrated in FIG. 2 said reduced thickness portion having an upper face 16. The axle member includes a post or trunnion 17 that extends upwardly from the base portion 10 and has a free end 18. In the illustrated structure, the base portion 10 and post 17 are integral preferably molded of suitable material such as plastic. The post 17 is a bearing member on which the support member 7 is rotated and maintained in assembled relation by the fastening member 8 as later described.

The support member 7 carries the arm or radial blade 3 and is rotatably supported on the axle member 5 with a lower portion resting on the base portion 10. The support member may be any suitable form and material and connection for the arm 3 and preferably is arranged for adjustment of the arm relative to the axis about which it is rotated to adjust the length of the radius of the arc drawn. In the structure illustrated, the support member 7 has a body portion provided with a bore 20 adapted to fit on the post 17 and rotate thereon. The body has a bottom 21 adapted to rest on the base portion 10. The bottom 21 has a lower surface 22 and a counter bore or recess 23 that is cylindrical and coaxial with the bore 20 said recess forming a shoulder 24 that rests on the upper face 11 of the base portion 10 and the surface 22 rests on the face 16. The counter bore 23 has an inner surface that may rotatably engage the periphery 15 of the portion 14 if desired for added bearing support.

The support member has a reduced sized upper portion 25 that serves as a hand hold for rotation. This structure acts as a knob and has longitudinally extending circumferentially spaced ribs 25 to aid in grasping same. The lower portion is an enlarged disc portion 27 extending outwardly of an upstanding knob portion 25. The disc portion 27 has periphery which in the structure illustrated is in step form having an outermost cylindrical periphery 28 and an inset cylindrical periphery 29 with a downwardly facing shoulder 30 therebetween. The cylindrical peripheries 28 and 29 are eccentric to the axis of the bore 20 to provide adjustment of the mounting of the arm or radial blade 3 as later described.

The bore 20 is sleeved on the cylindrical outer or bearing surface 32 of the upstanding post 17 with a minimum of clearance therebetween. The bore 20 and the bearing surface 32 cooperate to form a bearing permitting free relative rotation between the axle member 5 and the support member 7. The cylindrical portion 14 extends into the recess 23. In the illustrated structure, the free end 18 extends upwardly from the upper end 33 and the post 17 has a shoulder 34 thereon spaced from the free end 16 and adjacent the upper end 33 to receive the fastening member 8 as later described.

The elongate arm or bar 3 has opposite ends 37 and 38 and side portions 39 and 40 preferably converging from the end 37 toward the end 38 forming the edge around the arm 3. The arm 3 has an upper face 41 substantially parallel to a lower face 42 preferably is made of transparent material such as plastic so that the work surface can be viewed through the arm 3. A plurality of through marking device receiving apertures 44 are spaced along the longitudinal axis of the arm 3 and are normal to the upper and lower faces 41 and 42. The apertures 44 are preferably equally spaced apart a distance substantially corresponding to the range of fine adjustment of the eccentric adjusting means, for example, one eighth inch. The apertures 44 each have a chamfered mouth portion 46 opening outwardly toward the upper face 41 to facilitate insertion of a marking device (not shown) such as a pencil.

A bore 47 extends through the arm 3 substantially normal to the faces 41 and 42 and adjacent to the end 37. A recess 48 extends inwardly from the lower face 42 and around the bore 47 defining a downwardly facing shoulder 49. The bore 47 is slightly smaller than the inset periphery 29 on which it is mounted, a cut or slot 50 extends between the end 37 and the bore 47 permitting the bore 47 to be enlarged to receive the inset periphery 29 therein and provide a resilient frictional engagement between the arm 3 and support member 7 to urge the support member 7 to remain in a selected rotative position. The downwardly facing shoulder 30 overlies a portion of the upper face 41 and a portion of the upper face 16 of the base portion 10 engages the shoulder 49 sandwiching the arm 3 therebetween.

With the arm 3 mounted on the support member 7 the periphery of the enlarged disc portion is engaged in the bore 47 and the axis thereof is eccentric to the axis of the post 17 to provide for adjustment. The distance or spacing has a relation to the amount of relative rotation to provide the adjustment of the effective radius of the arm marking aperture. In the illustrated structure, the distance between the axes is substantially equal to one-half the spacing between the apertures 44 for example one-sixteenth inch. Rotation of the support member 7 relative to the arm 3 causes the axis of the post 17 to revolve about the axis of the bore 47 and the periphery 29 moving the center indicator 54 relative to the apertures 44 to add additional length to the desired radius. The eccentric axes and relative rotation of the arm 3 and support member 7 provides means for finely adjusting the desired radius. In the structure illustrated, the center indicator 54 is positioned on the longitudinal axis of the arm 3 between the apertures 44 and the axis of the bore 47 and the periphery 29 to be in the normal position. By holding the arm stationary and rotating the support member ninety degrees the center indicator 54 is moved relative to the apertures a distance equal to the spacing between the axes of the post 17 and the bore 47 and periphery 29 as for example one-sixteenth of an inch. By effecting said relative rotation through one hundred eighty degrees, the adjustment is twice the spacing of the axes or one-eighth inch which is the range of adjustment equal to the spacing between the apertures 44 in the illustrated form.

In the illustrated structure, the fastening means 8 is a collar that rests on the shoulder 34 and has such engagement with the post to hold the axle member 5, support member 7 and the arm 3 in assembled relation. The engagement may be threaded or other means of securing the collar to the post and in the structure illustrated, the engagement is a frictional tight fit.

To provide for locating the instrument relative to a point or center for an arc, the axle 5 has a bore 51 extending inwardly from the free end 18 and terminates in a convex surface forming one side of a magnifier lens 52. Although the lens 52 may be a separate part fixed in the bore 51, the axle 5 is preferably made of transparent material so that the lens 52 can be an integral part of the axle 5. The lower face 12 forms the other side of the lens and has a center indicator 54 thereon such as a bulls-eye or cross-hairs located on the axis of the post 17. The lower face 12 also has a groove or ring 56 therein opening downwardly preferably being coaxial with the axis of the post 17. A friction member or resilient ring 57 such as an O-ring is secured in the groove 56 with a portion thereof projecting below the lower face 12 to engage a work surface and have frictional engagement therewith to prevent slippage between the axle 5 and the work surface.

Indicia 59 is provided on the upper face 41 adjacent to each of the apertures 44 to indicate the normal radial distance from the axis of the post 17 to each aperture 44. Indicia 60 is provided on the upper face 41 adjacent to the support member 7 and a mark or indicia 61 is provided on the support member 7 to indicate the selected relative rotative position of the support member 7 to the arm 3 and the added distance or length of radius effected by relative rotation of the arm 3 and support member 7.

In operation, the drafting compass 1 is placed on a work surface and the center of an arc to be drawn is visually located through the lens 52 and registered with the center indicator 54. If the desired radius is equal to the spacing of one of the apertures 44 from the center indicator 54 then the support member 7 is set in the normal position as shown in FIG. 1 wherein the center indicator 54 is in a position on the longitudinal axis of the arm 3 between the apertures 44 and the axis of the bore 47 and the periphery 29. If additional radius length is desired, the support member 7 is rotated relative to the arm 3 until the indicia 61 corresponds to the desired additional length as indicated by indicia 60. The fine radius adjustment can be made before or after placing the compass 1 on the work surface. After locating the center of the arc to be drawn, force is applied to the collar 8 and hence the axle 5 and friction member 57 to increase the frictional engagement between the friction member 57 and the work surface to prevent shippage. This holds the center location without puncturing or marring of the work surface. A marking device is inserted into the desired aperture 44 and then the arm 3 and support member 7 are rotated about the axle 5 to inscribe the desired arc or circle.

It is to be understood that while I have illustrated and described certain forms of my invention, it is not to be limited to the specific forms or arrangement of parts herein described and shown.

What we claim and desire to secure by Letters Patent is:

1. A drafting compass comprising:
   a. an axle member having center designation means for locating the center of a circle to be drawn on a work surface;
   b. an elongate arm having a plurality marking device receiving means arranged longitudinally of said arm and spaced apart an increment of linear measurement;
   c. an adjusting member having portions in eccentric relation with one portion having a part upstanding relative to the other, said one portion being rotatably mounted on said axle member and the other said portion having a periphery with the axis thereof offset from the axis of said axle member a distance equal to one half the increment of measurement of the spacing of the marking device receiving means in the arm;

d. said arm being rotatably mounted on said periphery of said other portion of the adjusting member and frictionally engaging same to retain the arm and adjusting member in selected relative rotative positions, whereby rotation of said adjusting member relative to said arm effects relative movement between said marking device receiving means and said axle member to selectively adjust the radius of an arc drawn by said marking device.

2. A drafting compass comprising:
a. an axle member having an enlarged base portion and an upstanding post;
b. a support member having a bore sleeved on said post and rotatable thereon, said support member having a lower end and a cylindrical portion adjacent said lower end, said cylindrical portion being eccentric to the axis of the post member;
c. an arm mounted on said cylindrical portion for rotation about the axis thereof and having frictional engagement therewith to retain the arm and support member in selected relative rotative positions, said base portion being adapted to rest on a work surface and support said arm thereto in spaced relation;
d. means mounted on said axle member and cooperating with said base portion to retain said support member therebetween in assembled relation;
e. said arm having at least one aperture therethrough for receiving a marking device for marking an arc on a work surface as the arm and support member are rotated about the axis of the post;
f. said post having transparent means therein, said transparent means having an axis center indicator for visual register with a point or mark about which is an arc is to be drawn.

3. A drafting compass as set forth in claim 2 including:
a. first indicia on said arm to indicate the normal radial distance between said at least one aperture and said upstanding post, said radial distance being selectively changed in response to relative rotation of the arm and support member;
b. a plurality of spaced apart second indicia on said arm adjacent said support member, said support member having an indicator thereon to register with selected second indicia to indicate the amount of adjustment of the linear distance between the axis of said post and said at least one aperture.

4. A drafting compass as set forth in claim 2 wherein:
a. said at least one aperture being a plurality of apertures in equally spaced relation along the longitudinal axis of said arm;
b. said base portion having a lower face with a circular groove therein coaxial with the axle post and axis center indicator;
c. a resilient ring mounted in said groove and having a portion extending below said lower face of the base portion to frictionally engage a work surface to resist movement of the axle member relative thereto.

5. A drafting compass as set forth in claim 2 wherein:

a. said support member has an enlarged disc portion adjacent the lower and thereof, said cylindrical portion extending below said disc portion and spaced inwardly from a peripheral edge of said disc portion forming a downwardly facing shoulder on said disc portion;
b. said arm having an upper face engaged with said disc portion shoulder whereby said arm is between and engaged by said disc portion and said base portion.

6. A drafting compass as set forth in claim 5 wherein:

a. said means retaining the axle member and support member in assembled relation being a collar mounted on the post member and engaging the support member and cooperating with the base member and arm to prevent axial separation;
b. said base portion has a lower face with a friction member mounted thereon for frictional engagement with a work surface in response to pressure on said collar toward the work surface.

7. A drafting compass as set forth in claim 3 wherein:

a. said post being hollow;
b. said transparent means being a magnifier lens fixed in said hollow post adjacent said base portion;
c. said arm having a bore slightly smaller than said cylindrical portion of the support member and means permitting said bore to enlarge whereby said cylindrical portion is received in said bore and has resilient frictional engagement with said arm.

8. A drafting compass comprising:
a. an axle member having an enlarged base portion with an upper face and an upstanding post, said post having a cylindrical bearing surface, said base portion having a lower face, a ring member of resilient material mounted on the base portion and projecting below said lower face for frictional engagement with a work surface;
b. a support member having a bore sleeved on said post and rotatable thereon, said support member having upper and lower ends, said support member having an enlarged disc portion adjacent the lower end thereof, a cylindrical portion extending below said disc portion and having a periphery spaced inwardly from a peripheral edge of the disc portion and forming a downwardly facing shoulder on said disc portion, said cylindrical portion being eccentric to the axis of the post and the rotation of the support member thereon;
c. an elongate arm having opposite ends and a bore adjacent one end slightly smaller than the cylindrical portion of the support member, said arm having a cut extending from said one end to the arm bore whereby the bore is enlarged and is rotatably mounted on said cylindrical portion periphery and has resilient frictional engagement therewith to retain the arm and support member in selected relative rotative positions;
d. said arm having an upper face engaged with the downwardly facing shoulder of said disc portion, said arm having a lower face with a recess extending therein around the arm bore and defining a downwardly facing shoulder engaged by the base portion whereby the arm is between and engaged by said base portion and said disc portion;

e. a collar mounted on the upper end of the post and engaging the support member upper end to retain the axle member, support member and arm in assembled relation;

f. said arm having a plurality of equally spaced apertures therethrough and positioned along a longitudinal axis thereof for selectively receiving a marking device for marking an arc on said work surface as the arm and support member are rotated about the axis of the post, indicia on said arm adjacent respective apertures to indicate normal radial distance from the post axis;

g. said post being hollow, a magnifier lens member in said hollow post in fixed relation thereto and having an axis center indicator for visual register with a point or mark about which an arc is to be drawn;

h. indicia on the disc portion and arm to indicate increments of relative rotative position of the cylindrical eccentric portion and arm and the added radial distance to said apertures from the axis of the post effected thereby.

* * * * *